United States Patent [19]

Merk et al.

[11] Patent Number: 4,501,668
[45] Date of Patent: Feb. 26, 1985

[54] PROCESS FOR THE ELIMINATION OF HYDROGEN SULFIDE OR IRON SULFIDE FROM AN AQUEOUS SYSTEM

[75] Inventors: Wolfgang Merk, Tokyo, Japan; Karl-Heinz Rink, Hanau, Fed. Rep. of Germany

[73] Assignee: Degussa Aktiengesellschaft, Frankfurt am Main, Fed. Rep. of Germany

[21] Appl. No.: 558,534

[22] Filed: Dec. 6, 1983

[30] Foreign Application Priority Data

Dec. 7, 1982 [DE] Fed. Rep. of Germany ....... 3245139

[51] Int. Cl.$^3$ ............................. C02F 1/00; C02F 1/54
[52] U.S. Cl. .................................... 210/749; 210/732; 210/916; 252/8.55 E; 422/5; 422/14; 423/563
[58] Field of Search ............... 210/698, 631, 718, 732, 210/749, 750, 764, 916; 252/180, 388, 8.55 E; 422/5, 14; 423/243, 560, 563; 526/315

[56] References Cited

U.S. PATENT DOCUMENTS

| 2,267,276 | 12/1941 | Hager | 422/5 |
| 3,687,615 | 8/1972 | Gorin et al. | 423/243 |
| 3,883,303 | 5/1975 | Roberts | 422/5 |
| 4,160,656 | 7/1979 | Junkermann | 210/916 |

FOREIGN PATENT DOCUMENTS

| 1938634 | 2/1971 | Fed. Rep. of Germany | 422/5 |
| 1356707 | 2/1964 | France | 210/732 |
| 6906485 | 10/1970 | Netherlands | 210/749 |

Primary Examiner—Peter Hruskoci
Attorney, Agent, or Firm—Cushman, Darby & Cushman

[57] ABSTRACT

There are employed water soluble low molecular weight polycondensation products produced by the condensation of acrolein and formaldehyde in a molar ratio between 1:1 and 1:10 in aqueous or aqueous-organic medium in the presence of a basic catalyst for the elimination of hydrogen sulfide and iron sulfide present in aqueous systems. The condensation reaction can also be carried out in the additional presence of water soluble monohydric or polyhydric alcohols and-/or acid amides.

18 Claims, No Drawings

PROCESS FOR THE ELIMINATION OF HYDROGEN SULFIDE OR IRON SULFIDE FROM AN AQUEOUS SYSTEM

BACKGROUND OF THE INVENTION

The present invention is directed to the use of polycondensation products produced by the condensation of acrolein and formaldehyde in a molar ratio between 1:1 and 1:10 in aqueous or aqueous-organic medium in the presence of a basic catalyst for the elimination of hydrogen sulfide and iron sulfides present in aqueous systems.

It is already known to use acrolein to deodorize aqueous systems by the removal of hydrogen sulfide and by the combined effect with carbon dioxide to prevent or to hold as small as possible the corrosion on metals by acidic gases. It is true that the effectiveness of the acrolein is good. However, its use also has considerable disadvantages, above all because of its extraordinarily pungent odor even in the smallest concentration and because of its low flash point. Also there are moderate difficulties in homogeneously distributing small amounts of acrolein in a short period of time in water although acrolein is soluble in water to the extent of about 18%.

SUMMARY OF THE INVENTION

It has now been found that the disadvantages associated with the use of acrolein for the elimination of hydrogen sulfide from aqueous systems can be avoided by using low molecular weight water soluble polycondensation products of acrolein and formaldehyde in place thereof.

The use of these polycondensation products is very easy to design because they are readily dilutable with water. Besides they are substantially lower in odor than acrolein. Their effectiveness for the elimination of hydrogen sulfide is about that of acrolein, likewise the reaction velocity in the addition of hydrogen sulfide is similar to that of acrolein. Besides the toxicity of the polycondensate is substantially lower than that of acrolein as is shown by a comparison of the $LD_{50}$ value, both at 100% active material:

$LD_{50}$ of acrolein: 42 mg/kg (rat, oral)

$LD_{50}$ of a polycondensate of acrolein and formaldehyde (in the molar ratio 1:4) 830 mg/kg (rat, oral)

The polycondensation products used in the invention are produced through condensation of acrolein and formaldehyde in the molar ratio between 1:1 and 1:10, preferably between 1:2 and 1:4, in aqueous or aqueous-organic medium in the presence of a basic catalyst.

Suitable basic catalysts for example are sodium, potassium and ammonium hydroxides and carbonates, e.g. sodium hydroxide, potassium hydroxide, ammonium hydroxide, sodium carbonate, potassium carbonate and ammonium carbonate. Especially suited are primary, secondary or tertiary amines, e.g. triethyl amine, diethyl amine, ethyl amine, trimethyl amine, tributyl amine, morpholine, N,N-dimethylaniline. Preferably piperidine is used. The catalysts are used in an amount between 0.1 and 5 weight percent, preferably between 0.5 and 1 weight percent based on the weight of the acrolein and formaldehyde employed.

The formaldehyde can be used either in the form of an aqueous formaldehyde solution or in the form of paraformaldehyde, in which case there is then added water.

In many cases it is advantageous to carry out the condensation reaction in the additional presence of water soluble monohydric or polyhydric alcohols and/or acid amides, e.g. carboxylic acid amines. The alcohols and acid amides can be employed in an amount up to one mole per mole of acrolein employed and are at least partially built into the polycondensation product formed. When the alcohol or acid amide is employed, it is usually employed in an amount of 0.5 to 1.0 mole per mole of acrolein. Suitable alcohols for example are methanol, ethanol, n-propanol, isopropyl alcohol, ethylene glycol, 1,4-butanediol, propylene glycol, 1,3-propanediol, triethylene glycol, diethylene glycol and other water soluble polyglycols, e.g. dipropylene glycol and tetraethylene glycol. Especially suited is allyl alcohol. Suitable amides for example are acetamide, urea or caprolactam. Especially suited is formamide.

For economical reasons and also for reasons of effectiveness it is preferred to use the polycondensation product made from only acrolein and formaldehyde in the molar ratio of 1:4.

The condensation reaction proceeds with a strong exotherm. Relatively small batches can be carried out by mixing the reactants and then adding the catalyst, with larger batches, however, it is recommended to have present only a portion of the reactants or water or an alcohol together with the catalyst and to add slowly portionwise or continuously the rest of the reactants with such speed that the heat of reaction liberated can be drawn off without problem.

The polycondensation products formed in the condensation reaction are employed directly in the form of the aqueous or aqueous-organic solution for the use according to the invention to eliminate hydrogen sulfide which in a given case is even drawn out of already formed iron sulfide. The concentration of polycondensate employed, calculated as solids is in the range between about 1 and about 2000 ppm. This effectiveness concentration beginning with a few ppm is a requirement of the practice in order to successfully act against the initiation of the corrosion phenomena.

Naturally concentrations great than 2000 ppm are also usable but for economical reasons are not meaningful. Customarily the polycondensation products are used in a concentration between 5 and 500 ppm. But if the corrosion has already begun and iron sulfide is already formed there can be employed higher dosing, for example in the range between 1000 and 2000 ppm, for several weeks until the breakdown of this iron sulfide through removal of hydrogen sulfide and hydrolysis to iron hydroxide. When the sought for result of the treatment has been established the concentration can again be reduced appropriately.

The polycondensation products of the invention which also are effective as biocides have a dual and expanding activity:

1. As a biocide they prevent the growth of algae and destroy microorganisms living in the water, thus even the sulfate reducing bacteria. This type of bacteria, however, is the one which chiefly first forms hydrogen sulfide from sulfur containing organic materials.

2. As a binding agent for hydrogen sulfide the polycondensate however, removes the hydrogen sulfide eventually formed nevertheless in small amounts and therewith prevents corrosion with formation of iron sulfide.

Such a prevention of corrosion is particularly of great importance in the area of transporting petroleum in order to protect valuable transporting equipment and to increase their life and, e.g. with conveying probes, even to increase the petroleum field-transportation yield.

The iron sulfide formed without protective procedures of the type mentioned in a given case in fine distribution can be rinsed away and in the case of geologically porous mineral deposit rocks of the oil field can partially or even completely plug up these rocks. Through this the amount of conveyable petroleum is reduced and with complete blocking of the field the transportation is prevented completely. In order not to lose for the transportation of oil the petroleum field opened at high expense, there are needed corrosion causing acidifications in order to eliminate the iron sulfide blockages. These naturally are not necessary with use of the procedure described herein.

Also in other areas of use where through putrefaction processes hydrogen sulfide can arise, e.g. in waste water clarification plants, through insertion of the polycondensate there can be prevented the formation of hydrogen sulfide as well as the removal of the hydrogen sulfide formed in small amounts through reaction of the waste water system. Besides the corrosion prevention naturally desired in this area there also appears the further desired result of a detoxification and deodorization of the waste water. Since communal clarification plants are frequently placed in the vicinity of inhibited settlements making the waste water free from odor is significant to a high degree in protecting the environment for the people.

In the following examples, there are illustrated the production of a polycondensation product used in the invention and the listing of its effectiveness for removal of hydrogen sulfide and/or iron sulfide. Unless otherwise indicated all percentages are percent by weight.

The process can comprise, consist essentially of or consist of the stated steps with the recited materials.

DETAILED DESCRIPTION

EXAMPLE 1

There were present in a 250 cc round bottom flask equipped with a stirrer and reflux condenser 72.6 cc of an aqueous formaldehyde solution (content 37%, density 1.116)=1 mole and 0.5 cc of piperidine and the mixture preheated to 70° C. With stirring there was dropped in a homogeneous mixture of 34.5 cc of acrolein (purity 96%, density 0.845)=0.5 mole and a further 72.6 cc of the above mentioned formaldehyde solution=1 mole at such speed that a maximum temperature of 80° C. was reached but not exceeded. There was needed for this a time of 3 minutes. Subsequently stirring was continued for 1 hour at 80° C. and then the mixture was cooled to room temperature.

The thus obtained polycondensation product of acrolein and formaldehyde in the molar ratio 1:4 was tested as to its effectiveness in removing hydrogen sulfide and/or iron sulfide in various concentrations.

According to the methods of stepwise dilution 1.2 mg of sodium sulfide .9$H_2O$ (Mol. Wt. 240) from an originally more highly concentrated solution were dissolved in 100 cc of distilled water and by addition of 0.36 mg of hydrochloric acid (Mol. Wt. 36) there was liberated therefrom the stoichiometric amount of 0.17 mg=1.7 ppm of hydrogen sulfide. The small amount of hydrogen sulfide is clearly recognized by its odor.

By corresponding dilution there was then added to this solution 1.76 mg of the polycondensate solution. This amount of polycondensate corresponds to an original amount of acrolein employed of 0.56 mg. However, free acrolein was no longer present.

Within 2 to 3 days at room temperature the hydrogen sulfide odor completely disappeared and there was formed an odorless solution. The hydrogen sulfide even in this low concentration was practically quantitatively tied to the acroleinformaldehyde polycondensate with deodorization.

EXAMPLE 2

The procedure was carried out under analogous conditions to Example 1 using 100 cc of distilled water but in addition to the 1.2 mg of sodium sulfide .9$H_2O$ (Mol. Wt. 240) and 0.36 mg of hydrochloric acid (Mol. Wt. 36) through suitable dilution there was dissolved an amount of 1.4 mg of iron sulfate ($FeSO_4.7H_2O$). Under these conditions iron sulfide formed which did not precipitate because in the low concentrations used its solubility product was not exceeded. The solution smelled of hydrogen sulfide which obviously was present in equilibrium with iron sulfide.

Analogously to Example 1 there was again added through corresponding dilution 1.76 mg of the polycondensate solution in which there is contained a reacted amount of acrolein of 0.56 mg.

By reaction of the hydrogen sulfide with the polycondensate, as well as that from the equilibrium with iron sulfide, an odor free solution was formed in 2 days at 20° C.

EXAMPLE 3

According to the methods of stepwise dilution 12 mg of sodium sulfide .9$H_2O$ (Mol. Wt. 240) from an originally more highly concentrated solution were dissolved in 100 cc of distilled water and by addition of 3.6 mg of hydrochloric acid (Mol. Wt. 36) there was liberated therefrom the stoichiometric amount of 1.7 mg=17 ppm of hydrogen sulfide. The hydrogen sulfide is clearly recognizable by its odor.

There were then added to this solution 17.6 mg of the polycondensate solution of Example 1. This amount corresponds to an amount of acrolein employed for the production of polycondensate of 5.6 mg. However, free acrolein was no longer present.

Within 2 days at room temperature the hydrogen sulfide odor completely disappeared and there was formed an odorless solution. The hydrogen sulfide was practically quantitatively tied to the acrolein-formaldehyde-polycondensate and there was deodorization.

EXAMPLE 4

The procedure was carried out under analogous conditions to Example 3 using 100 cc of distilled water but in addition to the 12 mg of sodium sulfide 9$H_2O$ (Mol. Wt. 240) and 3.6 mg of hydrochloric acid (Mol. Wt. 36) through suitable dilution there was dissolved an amount of 14 mg of iron sulfate ($FeSO_4.7H_2O$). Under these conditions iron sulfide formed as a finely divided precipitate. The solution smelled of hydrogen sulfide which was present in equilibrium with iron sulfide.

Analogously to Example 3 there was again added through corresponding dilution 17.6 mg of the polycondensate solution. For the product of this amount of polycondensate there was needed 5.6 mg of acrolein.

By reaction of the hydrogen sulfide with the polycondensate, as well as that the from the equilibrium with iron sulfide (FeS), an odor free solution was formed in 2 days at 20° C. The iron sulfide hereby was converted to iron hydroxide by hydrolysis. At the low concentration the iron hydroxide was soluble in the water present.

EXAMPLE 5

According to the methods of stepwise dilution 120 mg of sodium sulfide .$9H_2O$ (Mol. Wt. 240) from an originally more highly concentrated solution were dissolved in 100 cc of distilled water and by addition of 36 mg of hydrochloric acid (Mol. Wt. 36) there was liberated therefrom the stoichiometric amount of 17 mg=170 ppm of hydrogen sulfide. The hydrogen sulfide is clearly recognizable by its intensive odor.

There were then added to this solution 176 mg of the polycondensate solution of Example 1. For the product of this amount of polycondensate there were needed 56 mg of acrolein (Mol. Wt. 56). However, free acrolein was no longer present.

Within 1 to 2 days at room temperature the hydrogen sulfide odor completely disappeared and there was formed an odorless solution. The hydrogen sulfide reacted practically quantitatively with the acrolein-formaldehyde-polycondensate with deodorization.

EXAMPLE 6

The procedure was carried out under analogous conditions to Example 5 using 100 cc of distilled water but in addition to the 120 mg of sodium sulfide ($Na_2S.9H_2O$) (Mol. Wt. 240) and 36 mg of hydrochloric acid (Mol. Wt. 36) through suitable dilution there was also dissolved 140 mg of iron sulfate ($FeSO_4.7H_2O$) (Mol. Wt. 278). There immediately formed a finely divided black precipitate of iron sulfide. The solution also smelled of hydrogen sulfide which was present in equilibrium with iron sulfide.

Analogously to Example 5 there was again added 176 mg of the polycondensate solution. For the production of this amount of polycondensate there were needed 56 mg of acrolein (Mol. Wt. 56). However, there was no free acrolein in the polycondensate.

By reaction of the hydrogen sulfide, as well as that from the hydrolyzing iron sulfide (FeS), with the polycondensate an odor free solution was formed in 1 to 2 days at room temperature and there was also present a rust brown iron hydroxide precipitate which was formed from the iron sulfide.

The entire disclosure of German priority application P3245139.3 is hereby incorporated by reference.

What is claimed is:

1. A process for the elimination of hydrogen sulfide, iron sulfide or a mixture of iron sulfide and hydrogen sulfide from an aqueous system comprising adding to the system an effective amount of a water soluble low molecular weight condensation product of acrolein and formaldehyde in the molar ratio of 1:1 to 1:10, said condensation product having been produced in the presence of a basic catalyst, to react with said hydrogen sulfide, said iron sulfide, or said mixture, and form an odor free aqueous solution.

2. A process according to claim 1 wherein the acrolein-formaldehyde condensation product is made from reactants consisting essentially of acrolein and formaldehyde.

3. A process according to claim 1 wherein the acrolein-formaldehyde condensation product is made from reactants consisting essentially of (1) acrolein, (2) formaldehyde and (3) an alcohol or an acid amide.

4. A process according to claim 3 wherein reactant (3) is a monohydric or polyhydric alcohol.

5. A process according to claim 4 wherein reactant 3 is allyl alcohol.

6. A process according to claim 3 wherein reactant 3 is a carboxylic acid amide.

7. A process according to claim 6 wherein the amide is formamide.

8. A process according to claim 1 wherein the molar ratio of acrolein to formaldehyde is from 1:2 to 1:4.

9. A process according to claim 8 wherein the molar ratio of acrolein to formaldehyde is 1:4.

10. A process according to claim 9 wherein there is added between 5 and 500 ppm of the condensate to the aqueous system.

11. A process according to claim 8 wherein there is added between 5 and 500 ppm of the condensate to the aqueous system.

12. A process according to claim 1 wherein there is added between 1 and 2000 ppm of the condensate to the aqueous system.

13. A process according to claim 12 wherein there is added between 5 and 2000 ppm of the condensate to the aqueous system.

14. A process according to claim 13 wherein there is added between 5 and 500 ppm of the condensate to the aqueous system.

15. A process according to claim 13 wherein there is added between 1000 and 2000 ppm of the condensate to the aqueous system.

16. A process according to claim 15 including the further step of reducing the concentration of the condensate in the aqueous system to 5 to 500 ppm after an initial reduction in the amount of hydrogen sulfide present in the aqueous system.

17. A process according to claim 1 wherein the aqueous system is free from iron sulfide.

18. A process according to claim 1 wherein the aqueous system contains iron sulfide.

* * * * *